(12) United States Patent
Iwase et al.

(10) Patent No.: US 9,475,378 B2
(45) Date of Patent: Oct. 25, 2016

(54) DRIVING DEVICE FOR HYBRID VEHICLE

(75) Inventors: Yuji Iwase, Mishima (JP); Hideaki Komada, Gotenba (JP); Yosuke Suzuki, Susono (JP); Hirotatsu Kitabatake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 80 days.

(21) Appl. No.: 14/424,231

(22) PCT Filed: Aug. 28, 2012

(86) PCT No.: PCT/JP2012/071720
§ 371 (c)(1),
(2), (4) Date: Feb. 26, 2015

(87) PCT Pub. No.: WO2014/033841
PCT Pub. Date: Mar. 6, 2014

(65) Prior Publication Data
US 2015/0202953 A1  Jul. 23, 2015

(51) Int. Cl.
*F16H 57/04* (2010.01)
*B60K 6/365* (2007.10)
(Continued)

(52) U.S. Cl.
CPC ............ *B60K 6/365* (2013.01); *B60K 6/383* (2013.01); *B60K 6/44* (2013.01); *B60K 6/445* (2013.01); *F16H 57/0482* (2013.01); *B60K 2006/381* (2013.01); *Y02T 10/6239* (2013.01); *Y10S 903/91* (2013.01)

(58) Field of Classification Search
CPC ............ F16H 57/0424; F16H 57/045; F16H 57/0476
See application file for complete search history.

(56) References Cited

U.S. PATENT DOCUMENTS 5,788,006 A    8/1998  Yamaguchi
5,823,282 A   10/1998  Yamaguchi
(Continued)

FOREIGN PATENT DOCUMENTS

JP    8 295140   11/1996
JP    9 56009    2/1997
(Continued)

OTHER PUBLICATIONS

Notice of Rejection in Japanese Patent Application No. 2014-532618 dated Aug. 11, 2015.
(Continued)

*Primary Examiner* — Tisha Lewis
(74) *Attorney, Agent, or Firm* — Oblon, McClelland, Maier & Neustadt, L.L.P.

(57) ABSTRACT

A driving device for the hybrid vehicle includes a planetary gear mechanism; a first rotating machine coupled to a sun gear of the planetary gear mechanism; an engine coupled to a carrier of the planetary gear mechanism; a second rotating machine and a drive wheel that are coupled to a ring gear of the planetary gear mechanism; and a regulating mechanism that regulates rotation of the carrier, wherein the driving device has a first driving region that allows executing a dual-drive mode that causes running using the first rotating machine and the second rotating machine as power sources, and a second driving region that allows executing a lubrication running mode that causes the first rotating machine to rotate the engine so as to lubricate the planetary gear mechanism and causes running using the second rotating machine as a single power source.

9 Claims, 9 Drawing Sheets (51) Int. Cl.
  *B60K 6/383* (2007.10)
  *B60K 6/445* (2007.10)
  *B60K 6/44* (2007.10)
  *B60K 6/38* (2007.10)

(56) References Cited

U.S. PATENT DOCUMENTS

| | | | | |
|---|---|---|---|---|
| 7,322,900 | B2* | 1/2008 | Ichioka | B60K 6/405 |
| | | | | 184/6.12 |
| 9,103,432 | B2* | 8/2015 | Isomura | F16H 57/0423 |
| 2002/0028725 | A1 | 3/2002 | Totsuka et al. | |
| 2008/0076616 | A1 | 3/2008 | Kidokoro et al. | |
| 2014/0358349 | A1* | 12/2014 | Okuda | B60K 6/445 |
| | | | | 701/22 |

FOREIGN PATENT DOCUMENTS

| | | |
|---|---|---|
| JP | 2000 355224 | 12/2000 |
| JP | 2002-081530 | 3/2002 |
| JP | 2008-074267 | 4/2008 |

OTHER PUBLICATIONS

Notice of Rejection in Japanese Patent Application No. 2014-532618 dated Dec. 22, 2015.
International Search Report Issued Oct. 9, 2012 in PCT/JP12/071720 Filed Aug. 28, 2012.

* cited by examiner

| EV RUNNING MODE | MG1 | MG2 | B | REMARKS |
|---|---|---|---|---|
| MG2 DRIVE | × | ○ | × | @EV1/HV MODE |
| ↑ | × | ○ | (○) | @EV1 MODE |
| MG1&MG2 DUAL-DRIVE | ○ | ○ | ○ | @EV2 MODE |

DRIVING DEVICE FOR HYBRID VEHICLE

FIELD

The present invention relates to a driving device for a hybrid vehicle.

BACKGROUND

Conventionally, a hybrid vehicle that runs with two motors is publicly known. For example, Patent Literature 1 discloses the technique in a hybrid-type vehicle where an engine, an output shaft, and a generator-motor are coupled together by a differential gear device. The technique stops the engine and compensates the lack of the driving force of the electric motor using the driving force of the generator-motor.

CITATION LIST

Patent Literature

Patent Literature 1: Japanese Patent Application Laid-open No. 8-295140

SUMMARY

Technical Problem

In the case where the hybrid vehicle runs while the engine is stopped, a planetary gear mechanism might have a lack of lubrication.

An object of the present invention is to provide a driving device for a hybrid vehicle that can inhibit the lack of lubrication in the planetary gear mechanism.

Solution to Problem

A driving device for a hybrid vehicle according to the present invention includes a planetary gear mechanism; a first rotating machine coupled to a sun gear of the planetary gear mechanism; an engine coupled to a carrier of the planetary gear mechanism; a second rotating machine and a drive wheel that are coupled to a ring gear of the planetary gear mechanism; and a regulating mechanism configured to regulate rotation of the carrier, wherein the driving device has a first driving region and a second driving region, the first driving region allowing execution of a dual-drive mode that causes running using the first rotating machine and the second rotating machine as power sources, the second driving region allowing execution of a lubrication running mode that causes the first rotating machine to rotate the engine so as to lubricate the planetary gear mechanism and causes running using the second rotating machine as a single power source.

In the driving device for the hybrid vehicle, it is preferable that the second driving region is a driving region that enables the second rotating machine alone to output a target driving force of the vehicle, and the lubrication running mode is preferably executed in the second driving region based on at least any one of a time elapsed while the engine is stopped or a distance traveled while the engine is stopped.

In the driving device for the hybrid vehicle, it is preferable to further include an oil pump coupled to the carrier and configured to supply lubricating oil to the planetary gear mechanism, wherein in the lubrication running mode, the first rotating machine preferably rotatably drives the oil pump.

In the driving device for the hybrid vehicle, it is preferable that the driving device further has a third driving region that allows execution of a single-drive mode that causes running using the second rotating machine as a single power source.

In the driving device for the hybrid vehicle, it is preferable that the first driving region, the second driving region, and the third driving region overlap with one another, and for a same vehicle speed, an upper-limit driving force in the third driving region is preferably smaller than an upper-limit driving force in the first driving region, and an upper-limit driving force in the second driving region is preferably smaller than the upper-limit driving force in the third driving region.

In the driving device for the hybrid vehicle, it is preferable that in the lubrication running mode, the carrier is rotated one or more revolutions.

Advantageous Effects of Invention

The driving device for the hybrid vehicle according to the present invention has the first driving region, which allows execution of the dual-drive mode that causes running using the first rotating machine and the second rotating machine as the power sources, and the second driving region, which allows execution of the lubrication running mode that causes the first rotating machine to rotate the engine so as to lubricate the planetary gear mechanism and causes running using the second rotating machine as the single power source. The driving device for the hybrid vehicle according to the present invention provides an effect that allows inihbiting the lack of lubrication in the planetary gear mechanism.

DESCRIPTION OF EMBODIMENTS

Hereinafter, a description will be given of a driving device for a hybrid vehicle according to an embodiment of the present invention in detail by referring to the accompanying drawings. This embodiment does not limit the invention. The constituent elements described below include various modifications that will readily occur to those skilled in the art, modifications substantially similar thereto, or what is called equivalent range thereof.

First Embodiment

Figure 1:
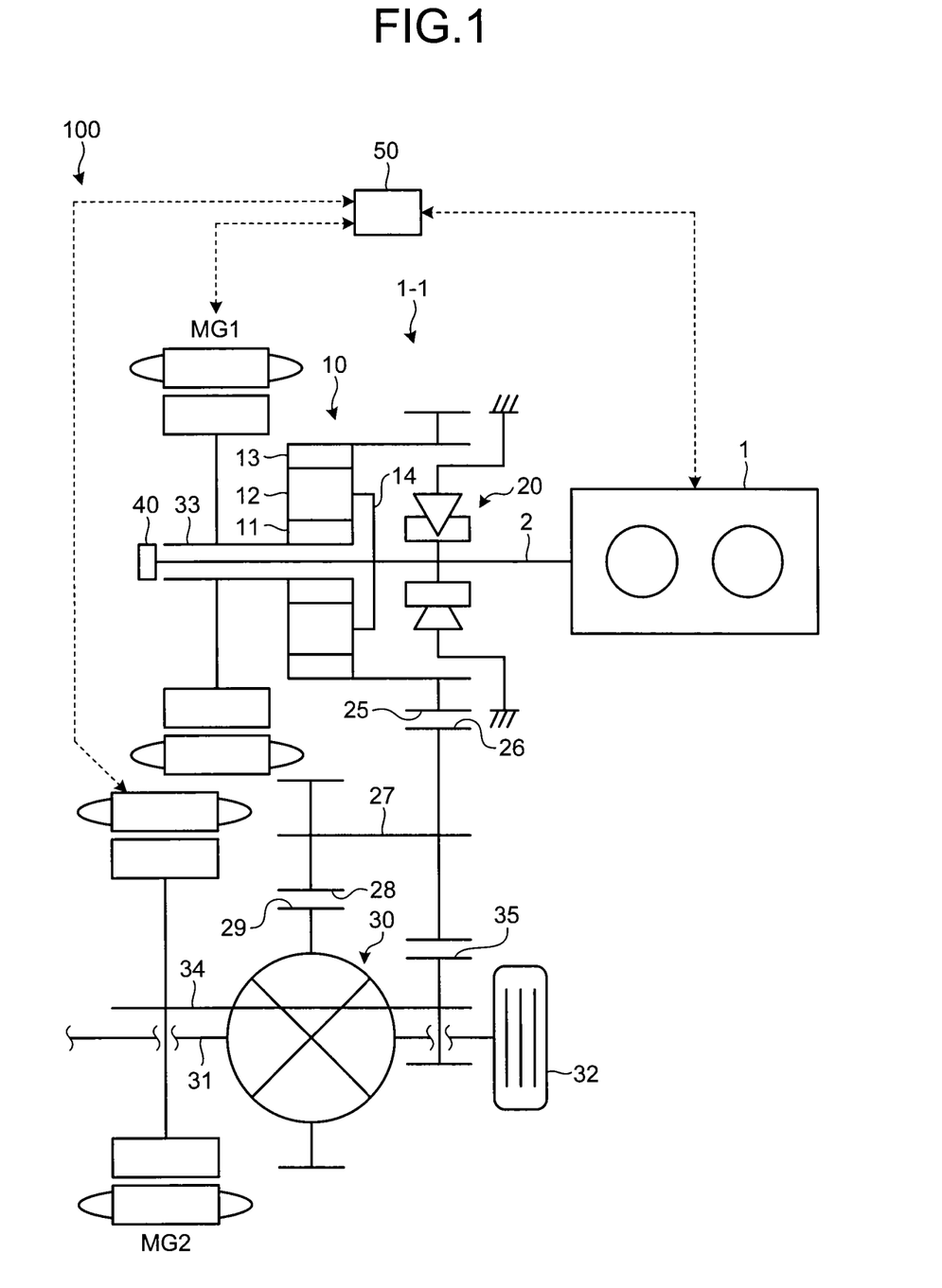
FIG. 1 is a skeleton diagram of a vehicle according to a first embodiment.
Figure 2:
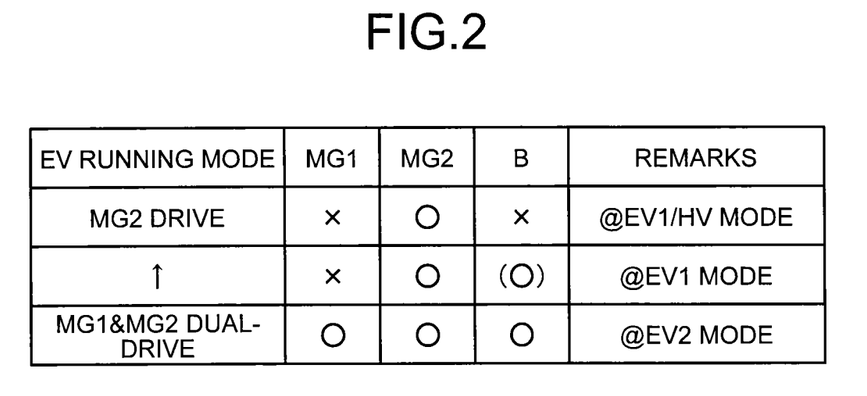
FIG. 2 is a diagram illustrating an operation engagement table of a driving device for a hybrid vehicle according to the first embodiment.
Figure 3:
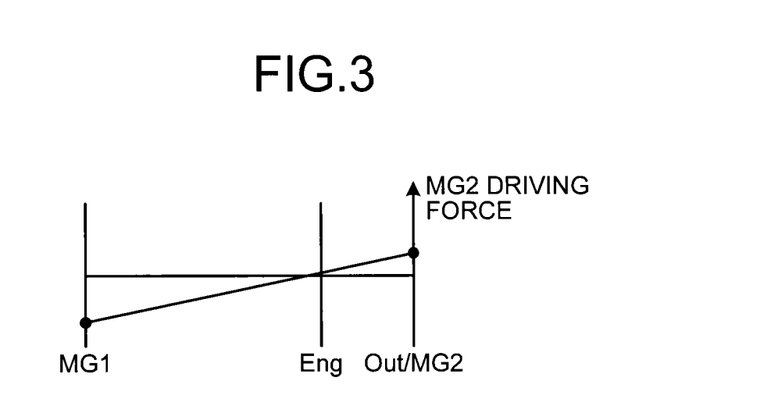
FIG. 3 is a alignment chart according to a single-drive EV mode.
Figure 4:
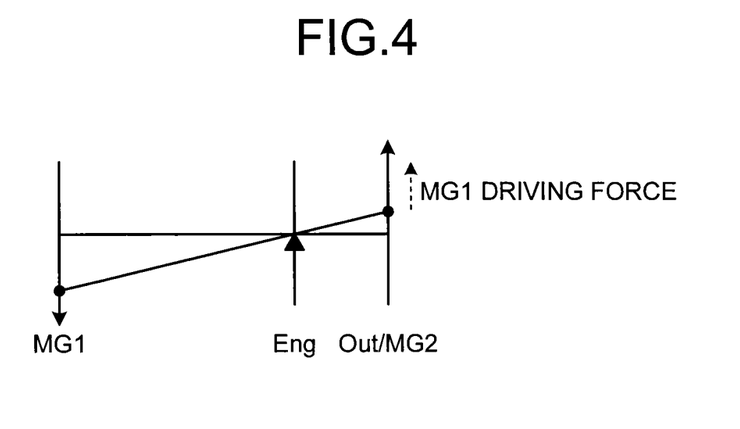
FIG. 4 is a alignment chart according to a dual-drive EV mode.
Figure 5:
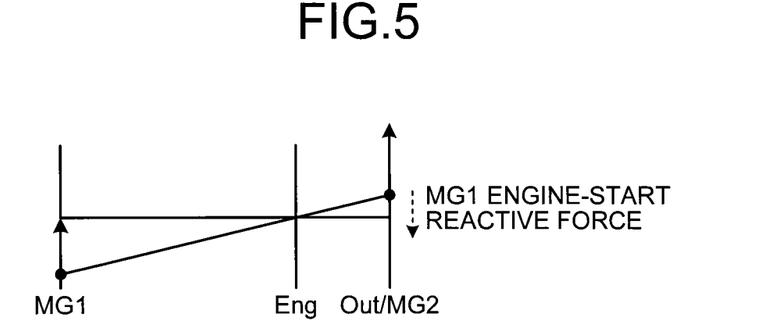
FIG. 5 is a alignment chart at an engine start.
Figure 6:
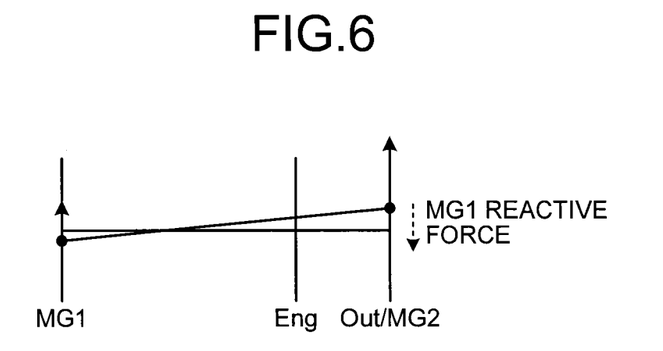
FIG. 6 is a alignment chart according to a lubrication running mode.
Figure 7:
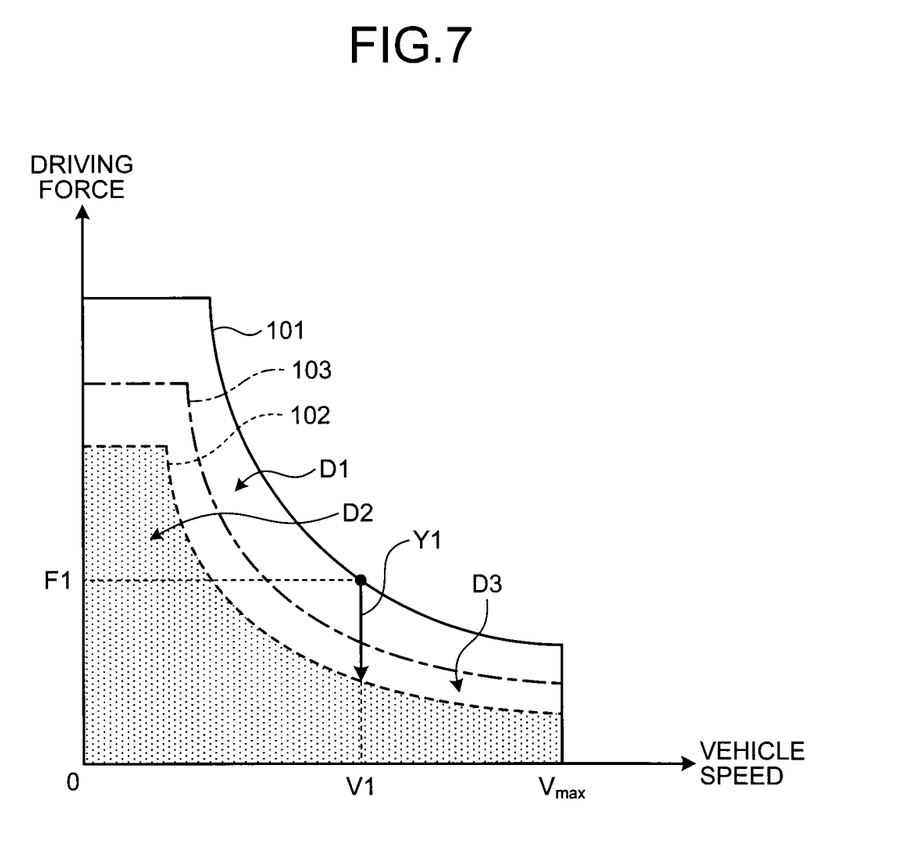
FIG. 7 is an explanatory diagram of driving regions.
Figure 8:
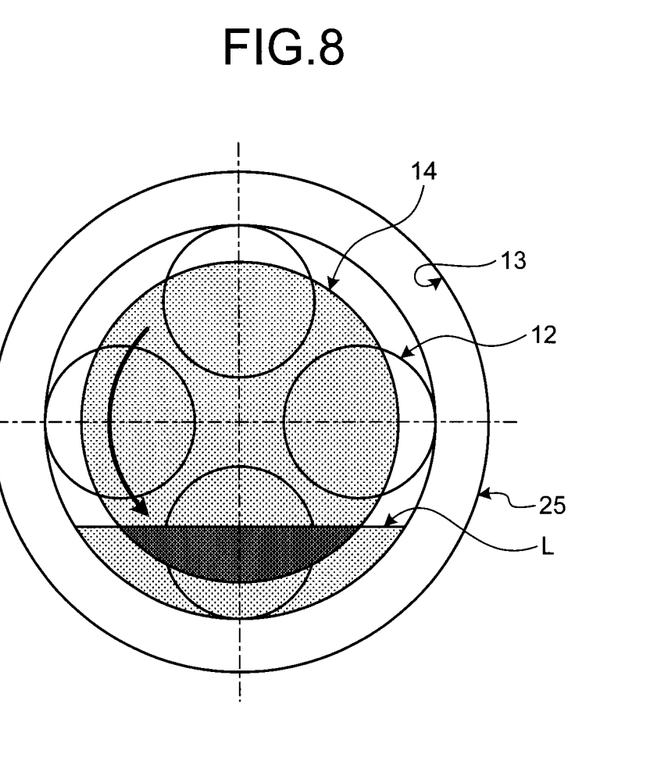
FIG. 8 is a cross-sectional view of a planetary gear mechanism.

A description will be given of a first embodiment with reference to FIG. 1 to FIG. 8. This embodiment relates to a driving device for a hybrid vehicle. FIG. 1 is a skeleton diagram of a vehicle according to the first embodiment of the present invention. FIG. 2 is a diagram illustrating an operation engagement table of a driving device for a hybrid vehicle according to the first embodiment. FIG. 3 is a alignment chart according to a single-drive EV mode. FIG. 4 is a alignment chart according to a dual-drive EV mode. FIG. 5 is a alignment chart at an engine start. FIG. 6 is a alignment chart according to a lubrication running mode. FIG. 7 is an explanatory diagram of driving regions. FIG. 8 is a cross-sectional view of a planetary gear mechanism.

A vehicle 100 according to this embodiment includes a one-way clutch (see reference numeral 20 in FIG. 1) for fixing an engine input element of a power split mechanism (see reference numeral 10 in FIG. 1). The vehicle 100 is provided with an HV system that has an EV running mode (EV2 mode) in which an engine 1 is stopped, the one-way clutch is fixed, and a first rotating machine MG1 and a second rotating machine MG2 are both driven.

During running in the EV2 mode, after a predetermined time has passed since the engine 1 is stopped, in the case where running in an EV1 mode by driving with the second rotating machine MG2 is available and the force that allows compensating the reactive force by the first rotating machine MG1 becomes equal to or less than the driving force, a lubrication running mode is performed. In the lubrication running mode, the first rotating machine MG1 rotates the engine 1 toward the positive rotation side to lubricate a power-splitting planetary gear. This allows lubricating the power-splitting planetary gear without causing the lack of driving force during dual-drive running.

As illustrated in FIG. 1, the vehicle 100 according to this embodiment is a hybrid (HV) vehicle that includes the engine 1, the first rotating machine MG1, and the second rotating machine MG2 as power sources. The vehicle 100 may be a plug-in hybrid (PHV) vehicle, which is chargeable from external power supply. In addition to the above-described power sources, the vehicle 100 includes a planetary gear mechanism 10, a one-way clutch 20, and drive wheels 32.

A driving device 1-1 for a hybrid vehicle according to this embodiment includes the engine 1, the planetary gear mechanism 10, the first rotating machine MG1, the second rotating machine MG2, the one-way clutch 20, and the drive wheel 32. The driving device 1-1 for the hybrid vehicle may further include an oil pump 40 and an ECU 50. The driving device 1-1 for the hybrid vehicle is applicable to a front-engine, front-wheel-drive (FF) vehicle, a rear-engine, rear-wheel-drive (RR) vehicle, or similar vehicle. The driving device 1-1 for the hybrid vehicle is, for example, mounted on the vehicle 100 to have the axial direction along the vehicle-width direction.

The engine 1 as an engine converts the combustion energy of fuel into the rotational motion of an output shaft and outputs the rotational motion. The output shaft of the engine 1 is coupled to an input shaft 2. The input shaft 2 is the input shaft of a power transmission device. The power transmission device includes the first rotating machine MG1, the second rotating machine MG2, the planetary gear mechanism 10, the one-way clutch 20, a differential device 30, and similar member. The input shaft 2 is arranged coaxially with the output shaft of the engine 1 and on the extended line of the output shaft. The input shaft 2 is coupled to a carrier 14 of the planetary gear mechanism 10.

The planetary gear mechanism 10 is a single-pinion type, and includes a sun gear 11, a pinion gear 12, a ring gear 13, and the carrier 14. The ring gear 13 is arranged coaxially with the sun gear 11 and in the radially outward direction of the sun gear 11. The pinion gear 12 is arranged between the sun gear 11 and the ring gear 13, and engages with each of the sun gear 11 and the ring gear 13. The pinion gear 12 is rotatably supported by the carrier 14. The carrier 14 is coupled to the input shaft 2, and rotates integrally with the input shaft 2. Accordingly, the pinion gear 12 is rotatable around the center axis line of the input shaft 2 together with the input shaft 2 (revolution). Additionally, the pinion gear 12 is supported by the carrier 14 and rotatable around the center axis line of the pinion gear 12 (rotation).

The sun gear 11 couples to a rotation shaft 33 of the first rotating machine MG1. The rotor of the first rotating machine MG1 is coupled to the sun gear 11 via the rotation shaft 33, and rotates integrally with the sun gear 11. The ring gear 13 couples to a counter drive gear 25. The counter drive gear 25 is the output gear that rotates integrally with the ring gear 13. The counter drive gear 25 is disposed on the outer peripheral surface of a cylindrical shaped member and the ring gear 13 is disposed on the inner peripheral surface.

The counter drive gear 25 engages with a counter driven gear 26. The counter driven gear 26 couples to a drive pinion gear 28 via a counter shaft 27. The counter driven gear 26 and the drive pinion gear 28 rotate integrally. The counter driven gear 26 engages with a reduction gear 35. The reduction gear 35 couples to a rotation shaft 34 of the second rotating machine MG2. That is, the rotation of the second rotating machine MG2 is transmitted to the counter driven gear 26 via the reduction gear 35. The reduction gear 35 has a smaller diameter than that of the counter driven gear 26, and decelerates the rotation of the second rotating machine MG2 to transmit the rotation to the counter driven gear 26.

The drive pinion gear 28 engages with a differential ring gear 29 of the differential device 30. The differential device 30 couples to the drive wheels 32 via right and left drive shafts 31. The ring gear 13 couples to the drive wheel 32 via the counter drive gear 25, the counter driven gear 26, the drive pinion gear 28, the differential device 30, and the drive shaft 31. The second rotating machine MG2 couples to the power transmission path between the ring gear 13 and the drive wheel 32, and can transmit power to each of the ring gear 13 and the drive wheel 32.

The first rotating machine MG1 and the second rotating machine MG2 each have a function as a motor (electric motor) and a function as an electric generator. The first rotating machine MG1 and the second rotating machine MG2 are coupled to a battery via an inverter. The first rotating machine MG1 and the second rotating machine MG2 can convert the electric power supplied from the battery into a mechanical power to output the mechanical power, and can be driven by an input power to convert the mechanical power into an electric power. The electric power generated by the rotating machines MG1 and MG2 can be stored in the battery. The first rotating machine MG1 and the second rotating machine MG2 can employ, for example, alternating current synchronous motor-generators.

The oil pump 40 couples to the engine 1 and the carrier 14 is a mechanical pump that is driven by rotation of the input shaft 2 to discharge lubricating oil. The oil pump 40 is arranged at the end portion at the opposite side of the engine 1 side in the input shaft 2. The lubricating oil transferred from the oil pump 40 is supplied to the planetary gear mechanism 10, the first rotating machine MG1, the engine 1, and similar member so as to lubricate and cool the respective portions. The planetary gear mechanism 10 has an oil passage that leads the lubricating oil, which is supplied to the oil pump 40 and similar member, to the pinion gear 12 and similar member. Also, the driving device 1-1 for the hybrid vehicle has an oil passage that supplies lubricating oil, which is transferred (scraped) upward by the differential ring gear 29, to each portion. The above-described oil passage supplies the lubricating oil to, for example, the planetary gear mechanism 10, the first rotating machine MG1, the second rotating machine MG2, the engine 1, and similar member.

In the vehicle 100 of this embodiment, the one-way clutch 20, the counter drive gear 25, the planetary gear mechanism 10, the first rotating machine MG1, and the oil pump 40 are arranged coaxially with the engine 1 in this order from the side close to the engine 1. The driving device 1-1 for the hybrid vehicle of this embodiment is a multi-shaft type where the input shaft 2 and the rotation shaft 34 of the second rotating machine MG2 are arranged on the different shafts.

The ECU 50 has a function as a control device that controls the vehicle 100. The ECU 50 is an electronic control unit with a computer, and controls the engine 1, the first rotating machine MG1, and the second rotating machine MG2. The ECU 50 receives inputs of signals indicative of various information such as information related to the engine 1, information related to the first rotating machine MG1, information related to the second rotating machine MG2, information related to a vehicle speed, information related to the battery, and information such as an accelerator position related to an operation input to operation equipment.

The one-way clutch 20 is disposed at the input shaft 2. The one-way clutch 20 is a regulating mechanism that regulates the rotation of the carrier 14. Assuming that the rotation direction of the input shaft 2 during operation of the engine 1 is the positive direction, the one-way clutch 20 allows the rotation of the input shaft 2 in the positive direction and regulates the rotation in the negative direction.

The vehicle 100 can selectively execute hybrid (HV) running or EV running. The HV running is a running mode that causes the vehicle 100 to run using the engine 1 as a power source. In the HV running, the second rotating machine MG2 may be used as the power source in addition to the engine 1.

The EV running is a running mode that causes running using at least any one of the first rotating machine MG1 and the second rotating machine MG2 as a power source. The EV running allows running while the engine 1 is stopped. The driving device 1-1 for the hybrid vehicle according to this embodiment has a single-drive EV mode (single-motor EV mode) and a dual-drive EV mode (dual-motor EV mode) as the EV running mode. The single-drive EV mode causes the vehicle 100 to run using the second rotating machine MG2 as a single power source. The dual-drive EV mode causes the vehicle 100 to run using the first rotating machine MG1 and the second rotating machine MG2 as power sources. Here, in this description, the single-drive EV mode is also described as the "EV1 mode" and the dual-drive EV mode is also described as the "EV2 mode." In this embodiment, the dual-drive EV mode corresponds to a dual-drive mode and the single-drive EV mode corresponds to a single-drive mode.

In the engagement table of FIG. 2, the mark of ○ in the columns of the first rotating machine MG1 and the second rotating machine MG2 denotes the state where the torque for running is output. The mark of x denotes the state where the torque for running is not output, that is, where any torque is not output, where the torque for other than running is output, where regeneration is performed, or similar state. The "B" column denotes the state of the one-way clutch 20. The mark of ○ denotes an engagement, and the mark of x denotes releasing. Here, the engagement or releasing of the one-way clutch 20 is not directly controlled but caused by the rotating state of the input shaft 2.

In an HV mode, the engine 1 rotates and the input shaft 2 rotates positively. Accordingly, the one-way clutch 20 becomes a released state. The single-drive EV mode (EV1 mode) illustrated in FIG. 3 is executable in any state of releasing or engagement of the one-way clutch 20. In each alignment chart, the leftmost vertical line denotes the rotation speed of the sun gear 11 and the first rotating machine MG1. The central vertical line denotes the rotation speed of the carrier 14 and the engine 1. The right vertical line denotes the rotation speed of the ring gear 13. The rotation speed of the ring gear 13 is proportional to the rotation speed of the second rotating machine MG2 and the rotation speed of the drive shaft 31.

In the dual-drive EV mode (EV2 mode) illustrated in FIG. 4, the one-way clutch 20 becomes an engaging state. In the dual-drive EV mode, the first rotating machine MG1 outputs a negative torque. The one-way clutch 20 engages to regulate the rotation of the carrier 14 so as to function as a reactive force receiver for the output torque (MG1 torque) of the first rotating machine MG1 and cause the ring gear 13 to output the positive torque corresponding to the MG1 torque. The positive torque output from the ring gear 13 is transmitted to the drive wheel 32 so as to generate the driving force for forward driving of the vehicle 100.

(Engine Start)

In the case where the driving device 1-1 for the hybrid vehicle starts the engine 1, the MG1 torque increases the rotation speed of the engine 1. As illustrated in FIG. 5, the first rotating machine MG1 outputs the positive torque to increase the rotation speed of the engine 1. At this time, the reactive force (engine-start reactive force), which is caused by rotatably driving the engine 1 by the MG1 torque, acts on the ring gear 13. The ECU 50 causes the second rotating machine MG2 to output a compensating torque to the engine-start reactive force in addition to the torque for forward driving of the vehicle 100, so as to inhibit fluctuation of the driving force at the engine start.

Here, in the case where the EV running causes running while the engine 1 is stopped, the lack of lubrication in the planetary gear mechanism 10 might occur. For example, in the case where running is performed while the one-way clutch 20 remains engaging in the dual-drive EV mode or the single-drive EV mode, the rotations of the input shaft 2 and the carrier 14 remain stopped. Accordingly, there is a possibility that the pinion gear 12 cannot be appropriately lubricated. In the dual-drive EV mode, although the torque of the first rotating machine MG1 is input to the pinion gear 12, the lubricating oil might not be supplied. Accordingly, the lack of lubrication might occur.

To lubricate the planetary gear mechanism 10, for example, it is possible to start the engine 1 so as to actuate the oil pump 40. However, in the case where the engine 1 starts in the dual-drive EV mode, the driving force by the first rotating machine MG1 is cancelled and the driving force is reduced by the engine-start reactive force. Accordingly, reduction in driving force unintended by the driver might occur.

Additionally, to lubricate the planetary gear mechanism 10, it is possible to rotate the engine 1 by the first rotating machine MG1 so as to actuate the oil pump 40. Also in this case, the lack of driving force similar to that at the start of the engine 1 occurs. Accordingly, reduction in driving force unintended by the driver might occur.

As described with reference to FIG. 7, the driving device 1-1 for the hybrid vehicle according to this embodiment has a first driving region D1, which causes running in the dual-drive EV mode, and a second driving region D2, in which the lubrication running mode is executable. This allows appropriately lubricating the planetary gear mechanism 10 while inhibiting the decrease in drivability due to the decrease in driving force.

In FIG. 7, the horizontal axis denotes the vehicle speed of the vehicle 100 and the vertical axis denotes the target driving force (or the required driving force) of the vehicle 100. The driving device 1-1 for the hybrid vehicle has the first driving region D1, the second driving region D2, and a third driving region D3 for the operating point as a combination of the vehicle speed and the driving force.

The first driving region D1 is a driving region that allows the dual-drive EV mode so as to allow execution of the dual-drive EV mode. The second driving region D2 is a driving region that allows the lubrication running mode so as to allow execution of the lubrication running mode. The lubrication running mode is a running mode that causes the first rotating machine MG1 to rotate the engine 1 so as to lubricate the planetary gear mechanism 10 and causes running using the second rotating machine MG2 as a single power source for running. The detail of the lubrication running mode will be described later. The third driving region D3 is a driving region that allows the single-drive EV mode so as to allow execution of the single-drive EV mode.

A first boundary line 101 indicates the respective upper-limit driving forces with respect to the vehicle speeds in the first driving region D1, and indicates the respective upper-limit vehicle speeds with respect to the driving forces in the first driving region D1. Similarly, a second boundary line 102 indicates the upper-limit driving forces and the upper-limit vehicle speeds in the second driving region D2, and a third boundary line 103 indicates the upper-limit driving forces and the upper-limit vehicle speeds in the third driving region D3.

In this embodiment, the respective driving regions D1, D2, and D3 have the common lower-limit vehicle speed of, for example, 0. The respective driving regions D1, D2, and D3 have the common lower-limit driving force of, for example, 0. The respective driving regions D1, D2, and D3 have a common maximum vehicle speed Vmax. The first driving region D1, the second driving region D2, and the third driving region D3 overlap with one another. In this embodiment, the third driving region D3 is included in the first driving region D1, and the second driving region D2 is included in the third driving region D3. That is, the third boundary line 103 is determined to be on the lower vehicle speed side and the lower driving force side with respect to the first boundary line 101, and the second boundary line 102 is determined to be on the lower vehicle speed side and the lower driving force side with respect to the third boundary line 103.

As illustrated in FIG. 7, for the same vehicle speed, the upper-limit driving force in the third driving region D3 is smaller than the upper-limit driving force in the first driving region D1, and the upper-limit driving force in the second driving region D2 is smaller than the upper-limit driving force in the third driving region D3.

The first boundary line 101 determines, for example, the upper-limit value of the driving force that can be generated by power running of the first rotating machine MG1 and the second rotating machine MG2 for each vehicle speed. The third boundary line 103 determines, for example, the upper-limit value of the driving force that can be generated by power running of the second rotating machine MG2 as a single power source for running for each vehicle speed. The second boundary line 102 determines, for example, the upper-limit value of the driving force that can be generated in the lubrication running mode for each vehicle speed.

Thus, since the three driving regions D1, D2, and D3 overlap with one another, there is the region with a plurality of the running modes are selectable. For example, in the second driving region D2, any of the dual-drive EV mode, the single-drive EV mode, and the lubrication running mode can be selected. In the third driving region D3, any of the dual-drive EV mode and the single-drive EV mode can be selected in the region between the second boundary line 102 and the third boundary line 103.

The ECU 50 has the maps indicative of the respective driving regions D1, D2, and D3, and determines the running mode to be executed based on the vehicle speed, the target driving force, a state of charge SOC of the battery, the respective states of the rotating machines MG1 and MG2, and similar parameter.

In this embodiment, in the case where both the single-drive EV mode and the dual-drive EV mode are executable, the dual-drive EV mode is basically selected. For example, in the case where the operating point is within the third driving region D3 and the condition under which the dual-drive EV mode is executable is satisfied, the dual-drive EV mode is preferentially selected. On the other hand, in the case where the condition under which the dual-drive EV mode is executable is not satisfied, the single-drive EV mode is selected. For example, in the case where power running of the first rotating machine MG1 is impossible due to the temperature condition of the first rotating machine MG1 or similar condition, or in the case where the first rotating machine MG1 causes the engine 1 to start, the single-drive EV mode is executed.

The lubrication running mode is executed in the case where the operating point is in the second driving region D2 and a predetermined driving condition is satisfied. In this embodiment, the lubrication running mode is executed based on the time elapsed while the engine 1 is stopped. In this embodiment, when a predetermined time elapses while the engine 1 is stopped, the above-described driving condition is satisfied and the lubrication running mode is executed. Here, the elapsed time since the engine 1 is stopped can be set as the elapsed time including, for example, the total running time while the engine 1 is stopped and the vehicle stopping time when the engine 1 is stopped. The predetermined time can be, for example, the time until running out of oil occurs in the pinion gear 12, as an example, several tens hours to several hundreds hours.

Here, instead of the elapsed time or in addition to the elapsed time, the lubrication running mode may be executed based on the distance traveled while the engine 1 is stopped. For example, the above-described driving condition may be satisfied by running a predetermined distance while the engine 1 is stopped. Thus, in this embodiment, the lubrication running mode is executed in the second driving region D2 based on at least any one of the time elapsed while the engine 1 is stopped and the distance traveled while the engine 1 is stopped.

As illustrated in FIG. 6, in the lubrication running mode, the first rotating machine MG1 outputs the positive torque so as to rotate the engine 1. Like FIG. 6, outputting the positive torque by causing negative rotation of the first rotating machine MG1 allows causing the regeneration state where the first rotating machine MG1 generates electricity. Here, in the lubrication running mode, it is also possible to cause positive rotation of the first rotating machine MG1. For example, in the case where it is impossible to charge the battery, it is possible to cause positive rotation of the first rotating machine MG1.

As illustrated in FIG. 8, lubricating oil L is accumulated at the inner side of the counter drive gear 25 and at the inner side of the ring gear 13. Rotating the engine 1 in the lubrication running mode allows rotation of the carrier 14 coupled to the engine 1 so as to cause revolution the pinion gear 12 as illustrated by the arrow. Accordingly, the lubricating oil L at the inner side of the counter drive gear 25 allows lubricating a pinion pin, a needle bearing, a pinion washer, and similar member in the pinion gear 12. Also, each portion of the planetary gear mechanism 10 can be lubricated. This allows inhibiting the occurrence of the lack of lubrication in the planetary gear mechanism 10 so as to prolong the cruising distance in the EV running. In the lubrication running mode, it is preferred that the input shaft 2 be rotated one or more revolutions. One or more revolutions of the input shaft 2 allows one or more revolutions of the carrier 14 so as to supply the lubricating oil L to all the pinion gears 12 in the planetary gear mechanism 10.

In the lubrication running mode, rotating the engine 1 allows rotatably driving the oil pump 40 so as to cause the oil pump 40 to supply the lubricating oil L to the planetary gear mechanism 10. This allows lubricating the lubricated portion in the planetary gear mechanism 10, for example, the pinion gear 12.

The second driving region D2 is determined to inhibit the lack of driving force during transition to the lubrication running mode. The second driving region D2 is the driving region that allows the second rotating machine MG2 alone to output the target driving force of the vehicle 100. The second boundary line 102 in this embodiment determines the upper-limit value of the torque that can be generated by the torque (MG2 torque) of the second rotating machine MG2 when the lubrication running mode is executed, for each vehicle speed. That is, the second boundary line 102 indicates the upper-limit driving force that can be generated by the MG2 torque in the case where the second rotating machine MG2 outputs the compensating torque to the reaction force torque when the first rotating machine MG1 rotates the engine 1.

Accordingly, this inhibits the lack of driving force during transition to the lubrication running mode from the dual-drive EV mode or the single-drive EV mode. When a transition to the lubrication running mode is made without determining such second driving region D2 in this embodiment, the lack of driving force might occur as described below. For example, as illustrated in FIG. 7, in the case where the lubrication running mode is started during running in the dual-drive EV mode at the operating point of a vehicle speed V1 and a driving force F1, the lack of driving force occurs as illustrated by an arrow Y1. When a transition is made from the dual-drive EV mode to the lubrication running mode, the first rotating machine MG1 does not function as the power source for running and then reduction in driving force by the MG1 torque occurs. Furthermore, the driving force is reduced by the reaction force torque due to rotation of the engine 1 by the first rotating machine MG1. Accordingly, reduction in driving force unintended by the driver occurs so as to cause reduction in drivability.

However, the driving device 1-1 for the hybrid vehicle of this embodiment allows the lubrication running mode in the case where the operating point is in the second driving region D2. Accordingly, this allows lubricating the planetary gear mechanism 10 without causing the lack of driving force.

The following describes the operation of the driving device 1-1 for the hybrid vehicle according to this embodiment. The ECU 50 monitors the running time and the running distance while the engine 1 is stopped. In the case where this running time is equal to or more than a predetermined time determined in advance, or in the case where the running distance is equal to or more than a predetermined distance determined in advance, the ECU 50 determines that the lubricating oil L needs to be supplied to the planetary gear mechanism 10. The ECU 50 executes the lubrication running mode in the case where the lubricating oil L needs to be supplied to the planetary gear mechanism 10 and where the operating point is in the second driving region D2. When the lubrication running mode is terminated, a transition is made to the EV running mode, for example, the dual-drive EV mode.

As described above, with the driving device 1-1 for the hybrid vehicle according to this embodiment, execution of the lubrication running mode allows the lubricating oil L accumulated within the counter drive gear 25 to lubricate the planetary gear mechanism 10 without causing the lack of driving force during running in the dual-drive EV mode. This allows prolonging the EV running distance. While the dual-drive EV mode causes power running of the two rotating machines MG1 and MG2 so as to cause large battery consumption, the lubrication running mode causes regeneration of the first rotating machine MG1 so as to allow charging the battery. This allows prolonging the EV running distance.

With the driving device 1-1 for the hybrid vehicle according to this embodiment, execution of the lubrication running mode allows the lubricating oil L, which is transferred by driving of the oil pump 40, to lubricate the planetary gear mechanism 10 without causing the lack of driving force during running in the dual-drive EV mode. Driving the oil pump 40 allows ensuring a sufficient amount of oil supplied to the planetary gear mechanism 10.

In the lubrication running mode, the rotation amount for rotating the input shaft 2 can be set to, for example, one revolution. This allows returning to the dual-drive EV mode while shortening the time spent for lubricating the first rotating machine MG1, so as to allow running intended by the driver. Additionally, this allows keeping a small amount of electric generation in the first rotating machine MG1, thus lubricating the planetary gear mechanism 10 also in the case where the state of charge SOC of the battery is close to the upper limit.

Here, while in this embodiment the driving device 1-1 for the hybrid vehicle has the map with the three driving regions D1, D2, and D3, the third driving region D3 may be eliminated. Providing a map with the first driving region D1 and the second driving region D2 allows transition to the lubrication running mode from the dual-drive EV mode without causing reduction in driving force so as to lubricate the planetary gear mechanism 10.

The driving device 1-1 for the hybrid vehicle executes the lubrication running mode based on the map, just as one example. This should not be construed in a limiting sense. That is, the driving device 1-1 for the hybrid vehicle controls the vehicle 100 so as to execute the dual-drive EV mode in the first driving region D1 and execute the lubrication running mode in the second driving region D2.

Second Embodiment

A second embodiment will be described with reference to FIG. 9. In the second embodiment, like reference numerals designate elements having corresponding or identical functions throughout the second embodiment and the above-described first embodiment, and therefore such elements will not be further elaborated here. This embodiment differs from the above-described first embodiment in that a region where the lubrication running mode is not executed is disposed at a low vehicle speed side. This allows inhibiting single-phase locking of the first rotating machine MG1.

Figure 9:
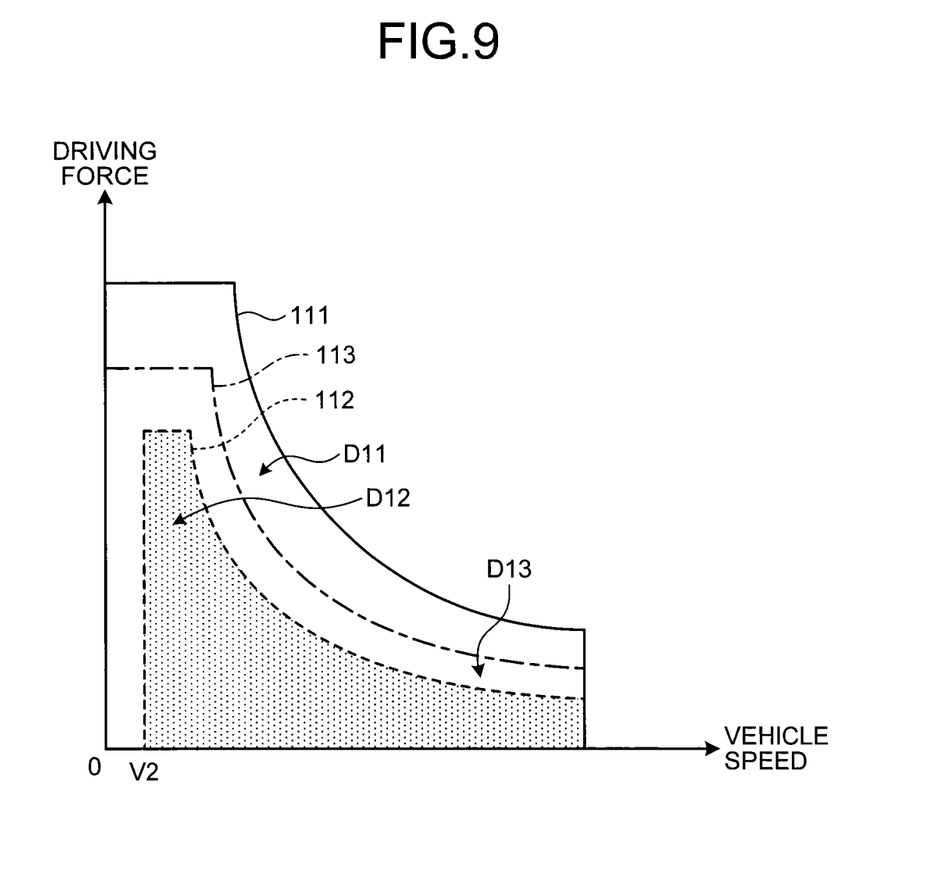
FIG. 9 is an explanatory diagram of the driving regions according to a second embodiment.

FIG. 9 is an explanatory diagram of driving regions according to the second embodiment. A first driving region D11 and a third driving region D13 can be set similarly to the respective first driving region D1 and third driving region D3 of the above-described first embodiment. That is, a first boundary line 111 and a third boundary line 113 can be set similarly to the respective first boundary line 101 and third boundary line 103 of the above-described first embodiment.

In this embodiment, a lower-limit vehicle speed V2 in a second driving region D12 is larger than the lower-limit vehicle speed (0) in a first driving region D11 and a third driving region D13. That is, the region where the lubrication running mode is not executed is disposed at the low vehicle speed side. The lower-limit vehicle speed V2 corresponds to, for example, an allowed lower-limit rotation speed that is preliminarily determined for the first rotating machine MG1. In the case where the first rotating machine MG1 performs power running or regeneration, a low rotation speed (MG1 rotation speed) of the first rotating machine MG1 might cause single-phase locking, which causes a continuous current flow in one phase, so as to cause overcurrent. Accordingly, the allowed lower-limit rotation speed for performing power running or regeneration is determined for the first rotating machine MG1.

The MG1 rotation speed during EV running is determined corresponding to the vehicle speed. The MG1 rotation speed becomes low rotation at a low vehicle speed. The lower-limit vehicle speed V2 is set to, for example, the vehicle speed at which the MG1 rotation speed during EV running becomes the allowed lower-limit rotation speed. The allowed lower-limit rotation speed can be set to, for example, 100 rpm as the absolute value of the rotation speed. That is, the lower-limit vehicle speed V2 is determined such that a current does not flow to the first rotating machine MG1 at the MG1 rotation speed of a rotation speed between −100 rpm and 100 rpm.

Thus, a second boundary line 112 is determined such that the lubrication running mode is not executed at the vehicle speed less than the lower-limit vehicle speed V2. This inhibits the occurrence of the single-phase locking in the first rotating machine MG1.

Third Embodiment

A third embodiment will be described with reference to FIG. 10. In the third embodiment, like reference numerals designate elements having corresponding or identical functions throughout the third embodiment and the above-described respective embodiments, and therefore such elements will not be further elaborated here. This embodiment differs from the above-described first embodiment and second embodiment in that a region where the lubrication running mode is not executed is disposed at a high vehicle speed side. This allows reducing agitation loss.

Figure 10:
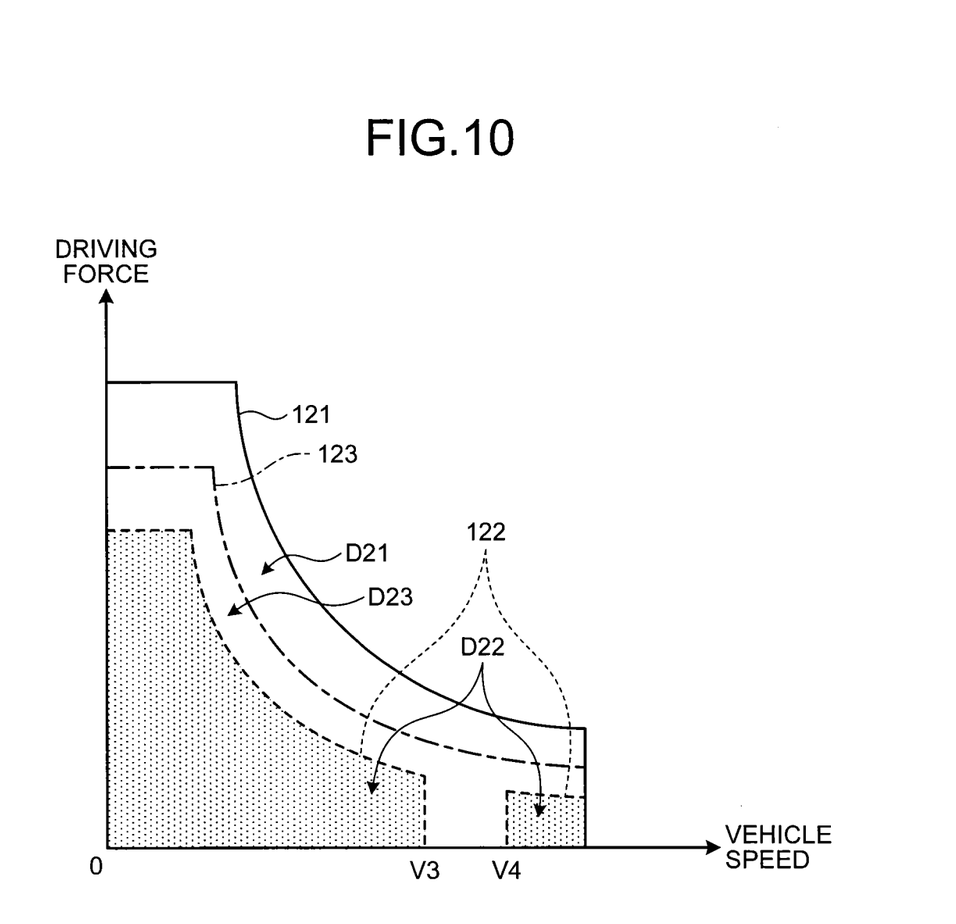
FIG. 10 is an explanatory diagram of the driving regions according to a third embodiment.

FIG. 10 is an explanatory diagram of driving regions according to the third embodiment. A first driving region D21 and a third driving region D23 can be set similarly to the respective first driving region D1 and third driving region D3 of the above-described first embodiment. That is, a first boundary line 121 and a third boundary line 123 can be set similarly to the respective first boundary line 101 and third boundary line 103 of the above-described first embodiment.

As illustrated in FIG. 10, a second driving region D22 is determined to have the region at a lower vehicle speed side with respect to a predetermined vehicle speed V3 and the region at a higher vehicle speed side with respect to a vehicle speed V4. The region at a higher vehicle speed with respect to the predetermined vehicle speed V3 and at a lower vehicle speed with respect to the vehicle speed V4 is the region where the lubrication running mode is not executed. The predetermined vehicle speed V3 is determined based on the scraping ability of the lubricating oil L by the differential ring gear 29. The scraping ability of the lubricating oil L by the differential ring gear 29 increases as the vehicle speed increases. An increase in amount of lubricating oil supplied by the differential ring gear 29 increases the oil amount in the counter drive gear 25. The predetermined vehicle speed V3 is the vehicle speed at which the oil level in the counter drive gear 25 is equal to or more than a certain level. Non-execution of the lubrication running mode in the region at the higher vehicle speed side with respect to the predetermined vehicle speed V3 allows reducing the agitation loss. Here, the predetermined vehicle speed V3 can be set to a higher vehicle speed than the lower-limit vehicle speed V2 in the above-described second embodiment.

The vehicle speed V4 is determined based on the differential rotation speed of the pinion gear 12. In the case where the carrier 14 is stopped, the differential rotation speed of the pinion gear 12 coincides with the rotation speed of the pinion gear 12. In EV running, when the vehicle speed is large, the differential rotation speed of the pinion gear 12 becomes large. In the region at the higher vehicle speed with respect to the vehicle speed V4, the lubrication running mode is allowed. This allows the oil pump 40 to lubricate the pinion gear 12 under the running condition where the differential rotation speed of the pinion gear 12 is large, so as to ensure reliability of the needle bearing of the pinion gear 12 and similar member.

Thus, a second boundary line 122 is determined not to execute the lubrication running mode at the vehicle speed between the predetermined vehicle speed V3 and the vehicle speed V4. This allows ensuring the compatibility between reduction in agitation loss, and ensuring the reliability of the pinion gear 12.

First Modification of Above-Described Respective Embodiments

Figure 11:
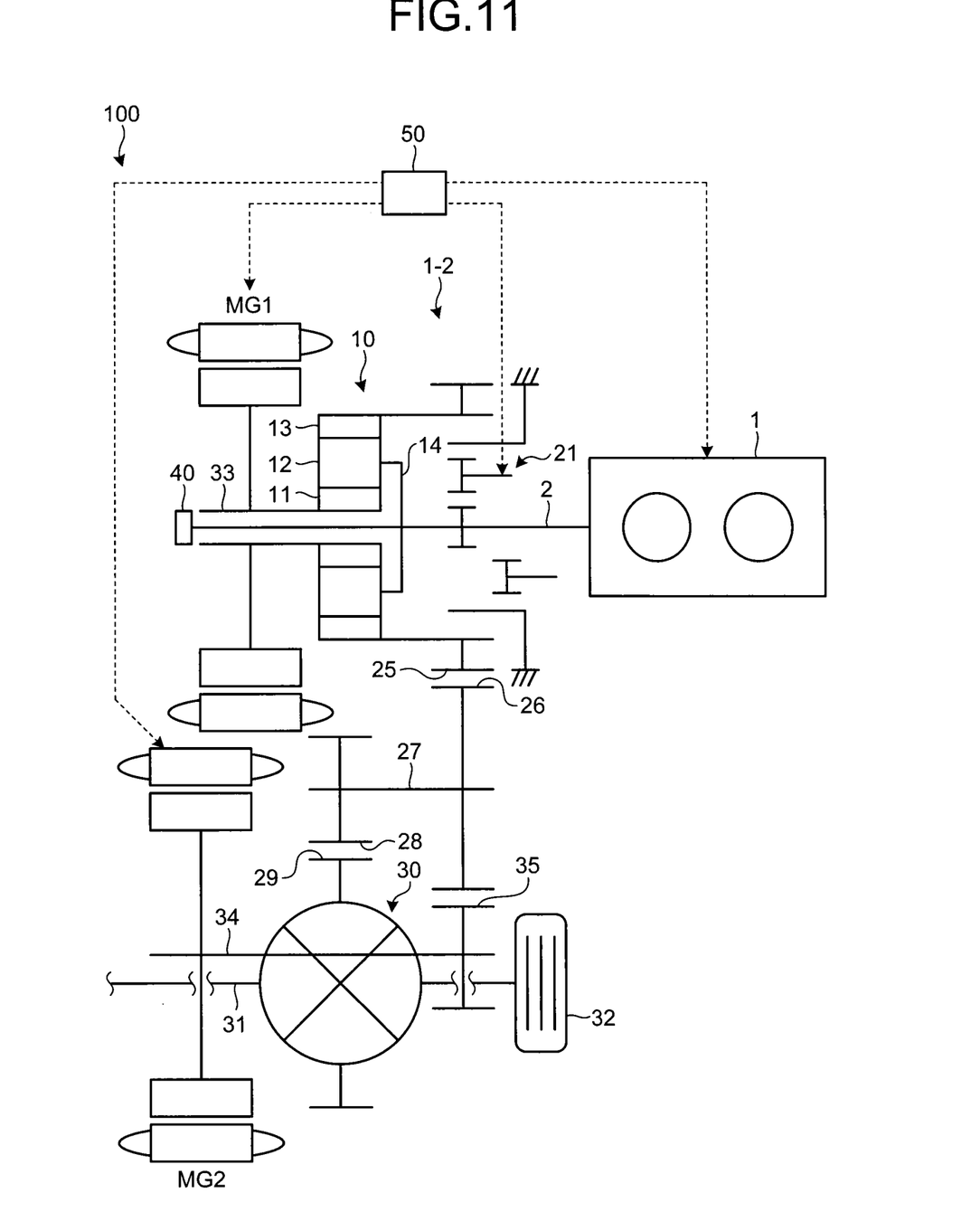
FIG. 11 is a skeleton diagram of a vehicle according to a first modification.

A description will be given of a first modification of the above-described first embodiment to the third embodiment. FIG. 11 is a skeleton diagram of a vehicle according to the first modification. A driving device 1-2 for a hybrid vehicle according to the first modification differs from the driving device 1-1 for the hybrid vehicle of the above-described respective embodiments in that a dog brake 21 is provided as the regulating mechanism instead of the one-way clutch 20.

As illustrated in FIG. 11, the dog brake 21 is disposed at the input shaft 2. The dog brake 21 is an engagement-type brake device, and engages or releases the vehicle body side and the input shaft 2. The dog brake 21 in the engaging state regulates the rotations of the input shaft 2 and the carrier 14. The dog brake 21 is controlled by the ECU 50.

In the engagement table illustrated in FIG. 2, the dog brake 21 engages in the running mode where engagement (○) is indicated in the "B" column. The ECU 50 causes the first rotating machine MG1 to control the rotation speed of the input shaft 2 to have 0 rotation so as to engage the dog brake 21. The ECU 50 releases the dog brake 21 in the running mode where releasing (x) is indicated in the "B" column.

Second Modification of Above-Described Respective Embodiments

Figure 12:
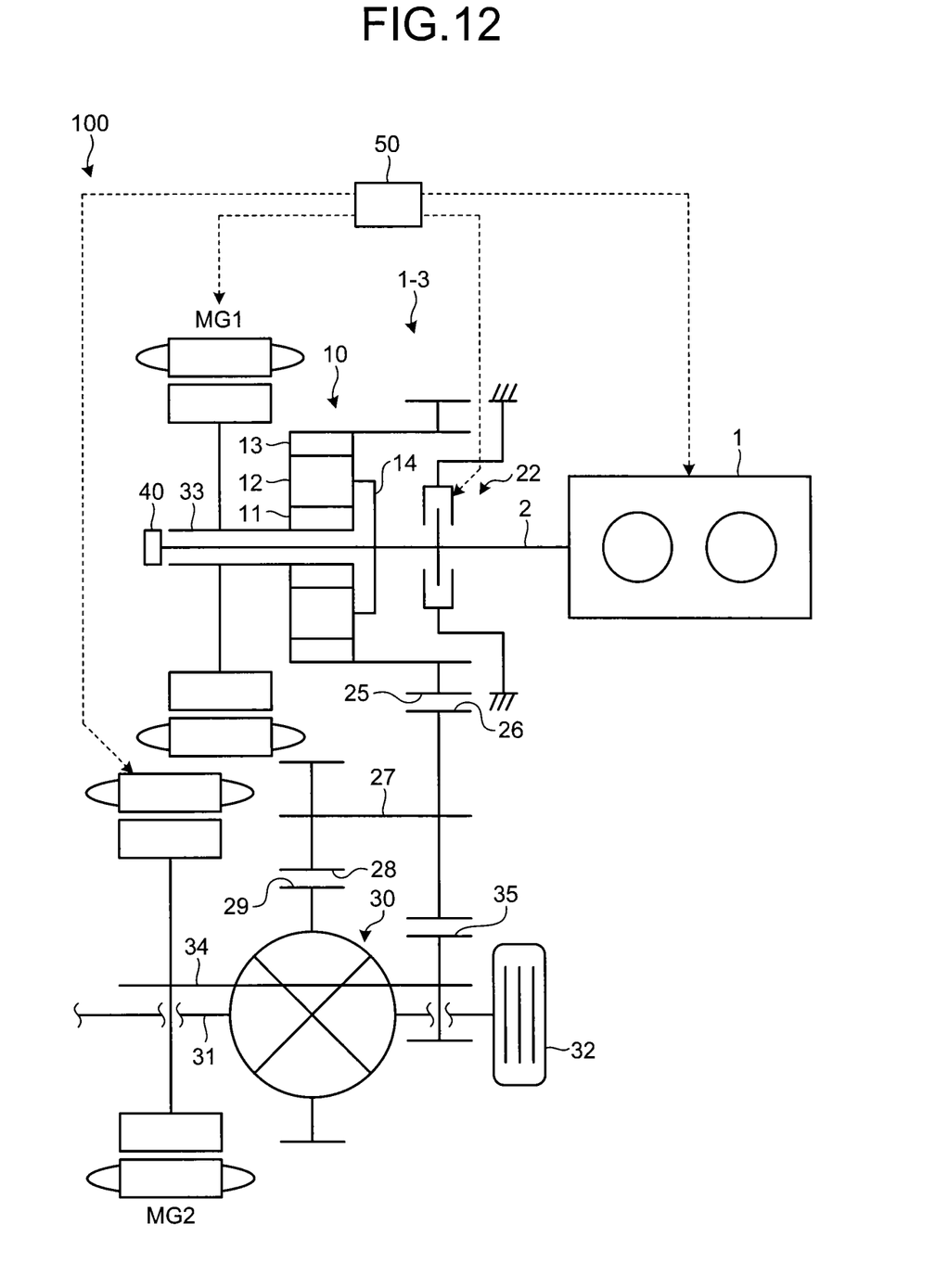
FIG. 12 is a skeleton diagram of a vehicle according to a second modification.

A description will be given of a second modification of the above-described first embodiment to the third embodiment. FIG. 12 is a skeleton diagram of a vehicle according to the second modification. A driving device 1-3 for a hybrid vehicle according to the second modification differs from the driving device 1-1 for the hybrid vehicle of the above-described respective embodiments in that a friction brake 22 is provided as the regulating mechanism instead of the one-way clutch 20.

As illustrated in FIG. 12, the friction brake 22 is disposed at the input shaft 2. The friction brake 22 is a friction-engagement-type brake device, and engages or releases the vehicle body side and the input shaft 2. The friction brake 22 in the engaging state regulates the rotations of the input shaft 2 and the carrier 14. The friction brake 22 is controlled by the ECU 50.

In the engagement table illustrated in FIG. 2, the friction brake 22 engages in the running mode where engagement is indicated in the "B" column. The friction brake 22 is released in the running mode where releasing is indicated.

The matters that are disclosed in the respective embodiments described above may be combined as necessary.

REFERENCE SIGNS LIST 1-1, 1-2, and 1-3 driving device for hybrid vehicle
1 engine
10 planetary gear mechanism
11 sun gear
12 pinion gear
13 ring gear
14 carrier
20 one-way clutch
32 drive wheel
40 oil pump
50 ECU
100 vehicle
D1 first driving region
D2 second driving region
D3 third driving region

The invention claimed is:

1. A driving device for a hybrid vehicle, comprising:
a planetary gear mechanism;
a first rotating machine coupled to a sun gear of the planetary gear mechanism;
an engine coupled to a carrier of the planetary gear mechanism;
a second rotating machine and a drive wheel that are coupled to a ring gear of the planetary gear mechanism; and
a regulating mechanism configured to regulate rotation of the carrier, wherein
the driving device has a first driving region and a second driving region, the first driving region allowing execution of a dual-drive mode that causes running using the first rotating machine and the second rotating machine as power sources, the second driving region allowing execution of a lubrication running mode that causes the first rotating machine to rotate the engine so as to lubricate the planetary gear mechanism and causes running using the second rotating machine as a single power source, and
in the second driving region, the lubrication running mode is not performed in a region at a higher vehicle speed with respect to a vehicle speed determined based on a scraping ability of a lubricating oil by a differential ring gear provided between the ring gear and the drive wheel and at a lower vehicle speed with respect to a vehicle speed determined based on a differential rotation speed of a pinion gear in the planetary near mechanism.

2. The driving device for the hybrid vehicle according to claim 1, wherein
the second driving region is a driving region that enables the second rotating machine alone to output a target driving force of the vehicle, and
lubrication running mode is executed in the second driving region based on at least any one of a time elapsed while the engine is stopped and a distance traveled while the engine is stopped.

3. The driving device for the hybrid vehicle according to claim further comprising:
an oil pump coupled to the carrier and configured to supply lubricating oil to the planetary gear mechanism, wherein
in the lubrication running mode, the first rotating machine rotatably drives the oil pump.

4. The driving device for the hybrid vehicle according to claim 1, wherein
the driving device further has a third driving region that allows execution of a single-drive mode that causes running using the second rotating machine as a single power source.

5. The driving device for the hybrid vehicle according to claim 4, wherein
the first driving region, the second driving region, and the third driving region overlap with one another, and
for a same vehicle speed, an upper-limit driving force in the third driving region is smaller than an upper-limit driving force in the first driving region, and an upper-limit driving force in the second driving region is smaller than the upper-limit driving force in the third driving region.

6. The driving device for the hybrid vehicle according to claim 1, wherein
in the lubrication running mode, the carrier is rotated one or more revolutions.

7. The driving device for the hybrid vehicle according to claim 2, wherein
   the driving device further has a third driving region that allows execution of a single-drive mode that causes running using the second rotating machine as a single power source.

8. The driving device for the hybrid vehicle according to claim 3, wherein
   the driving device further has a third driving region that allows execution of a single-drive mode that causes running using the second rotating machine as a single power source.

9. The driving device for the hybrid vehicle according to claim 2, wherein
   in the lubrication running mode, the carrier is rotated one or more revolutions.

\* \* \* \* \*